(12) United States Patent
Ishioka et al.

(10) Patent No.: US 7,944,617 B2
(45) Date of Patent: May 17, 2011

(54) LENS ARRAY DEVICE AND IMAGE DISPLAY DEVICE

(75) Inventors: Koji Ishioka, Kanagawa (JP); Sho Sakamoto, Tokyo (JP); Hiroyuki Okita, Tokyo (JP); Yuichi Takai, Tokyo (JP); Kenichi Takahashi, Kanagawa (JP); Masayoshi Akita, Tokyo (JP); Yasuhiro Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/690,463

(22) Filed: Jan. 20, 2010

(65) Prior Publication Data
US 2010/0195190 A1 Aug. 5, 2010

(30) Foreign Application Priority Data
Jan. 30, 2009 (JP) .............................. P2009-020662

(51) Int. Cl.
*G02B 1/06* (2006.01)
*G02B 3/12* (2006.01)
(52) U.S. Cl. ...................................... 359/665
(58) Field of Classification Search .................. 359/665
See application file for complete search history.

(56) References Cited

U.S. PATENT DOCUMENTS

| 6,069,650 A | 5/2000 | Battersby |
| 6,238,911 B1 * | 5/2001 | Kasahara .................. 435/288.4 |
| 2003/0085850 A1 | 5/2003 | Feenstra et al. |

FOREIGN PATENT DOCUMENTS

| JP | 2000-503424 | 3/2000 |
| JP | 2005-506778 | 3/2005 |

OTHER PUBLICATIONS

Dick K.G. de Boer, Martin G.H. Hiddink, Maarten Sluijter, Oscar H. Willemsen and Sibe T. de Zwart, "Switchable lenticular based 2D/3D displays", SPIE vol. 6490, 64900R(2007).

"Liquid Lens Technology: Principle of Electrowetting Based Lenses and Applications to Imaging" B. Berge, Proc. of IEEE Int'l Conf. Of MEMS, (2005).

* cited by examiner

*Primary Examiner* — William C Choi
(74) *Attorney, Agent, or Firm* — K&L Gates LLP (57) ABSTRACT

A lens array device and an image display device using the lens array device, which allow a lens effect characteristic different from that of a single variable lens array to be easily obtained, are provided. The lens array device includes a variable lens array and a fixed lens array. The variable lens array includes a plurality of variable lenses each having electrically-adjustable refracting power. The fixed lens array includes a plurality of fixed lenses each provided in correspondence to each of the plurality of variable lenses. Each of the fixed lenses has a refracting power which, once a corresponding variable lens has come to have a first refracting power, allows the first refracting power to be cancelled out.

13 Claims, 8 Drawing Sheets

LENS ARRAY DEVICE AND IMAGE DISPLAY DEVICE

CROSS REFERENCES TO RELATED APPLICATIONS

The present application claims priority to Japan Priority Patent Application JP 2009-020662 filed in the Japan Patent Office on Jan. 30, 2009, the entire content of which is hereby incorporated by reference.

BACKGROUND

The present application relates to a lens array device that may electrically adjust lens refracting power, and to an image display device that may be electrically changed in display mode, for example, between two-dimensional display and three-dimensional display by using the lens array device.

In the past, a twin-lens or multi-lens three-dimensional display device has been known, which displays parallax images on observer's eyes to achieve stereoscopic vision. A spatial-image-type three-dimensional display device is given as a method of achieving more natural stereoscopic vision. In the spatial image type, a plurality of light beams having different radiation directions are radiated into a space, thereby spatial images correlating to a plurality of view angles are formed.

As a method of achieving the three-dimensional display device, for example, a combination of a two-dimensional display device such as liquid crystal display device and an optical device for three-dimensional display is known, the optical device deflecting display image light from the two-dimensional display device in a plurality of view angle directions. For example, as shown in FIG. 7A, cylindrical lens array 302 including a plurality of cylindrical lenses 303 arranged in parallel is used for the optical device for three-dimensional display.

Figure 7:
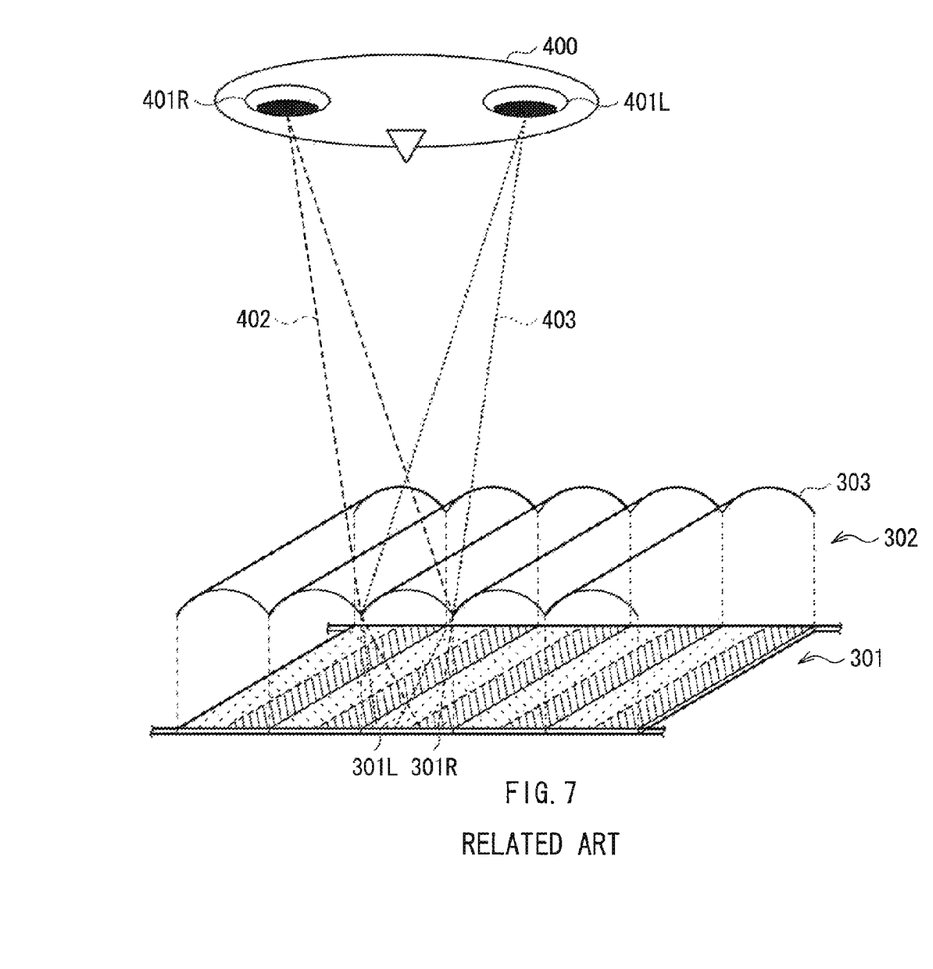
FIG. 7 is a section view showing a configuration example of a three-dimensional display device in the past.

FIG. 7 shows a configuration example of the twin-lens three-dimensional display device. The three-dimensional display device is configured such that the cylindrical lens array 302 is opposed to a display surface of a two-dimensional display device 301. In the cylindrical lens array 302, each cylindrical lens 303 extends in a longitudinal direction with respect to the display surface of the two-dimensional display device 301 so as to have refracting power in a horizontal direction. A plurality of display pixels are regularly two-dimensionally arranged on the display surface of the two-dimensional display device 301. Each cylindrical lens 303 is allocated with adjacent two pixel arrays 301R and 301L on the display surface of the two-dimensional display device 301. One pixel array 301R is to display a right parallax image, and the other pixel array 301L is to display a left parallax image. The displayed parallax images are separated into horizontally different light paths 402 and 403 by each cylindrical lens 303. Thus, the right and left, parallax images appropriately arrive at eyes 401R and 401L of an observer 400.

The right parallax image and the left parallax image are configured, for example, in the following way. For example, two images, which are taken by lenses placed at positions corresponding to right and left visual points, and in directions corresponding to directions from the visual points, are cut into strips having width half the horizontal lens pitch of the cylindrical lenses 303, and alternately displayed in rows. That is, strip images cut from the right and left parallax images are displayed by one each in a region corresponding to one cylindrical lens 303. At that time, when the observer 400 views the three-dimensional display device from a certain position and a certain direction, the right parallax image and the left parallax image formed by the cylindrical lens array 302 are selectively injected at a right eye position and a left eye position respectively, and thus a stereoscopic image is perceived.

Similarly, in the case of the multi-lens type device, a plurality of parallax images, which are taken at positions corresponding to at least three visual points, and in directions corresponding to directions from the visual points, are displayed while being equally divided within a horizontal lens pitch of the cylindrical lenses 303 and correspondingly allocated. Thus, at least three parallax images are ejected in continuous, different angle ranges by the cylindrical lens array 302, and then focused. In this case, a plurality of different parallax images are perceived depending on variation in position or direction of a line of sight of the observer 400. As number of different parallax images in accordance with different visual points is increased, a more realistic stereognostic-sense may be obtained.

For example, a resin-molded lens array having a fixed shape and a fixed lens effect may be used as the cylindrical lens array 302. In this case, since the lens effect is fixed, a display device specially designed for three-dimensional display is formed. On the other hand, since a capability of displaying a two-dimensional image such as a letter or planar figure, which need not be stereoscopically displayed, is still demanded, a display device is desired to be able to be changed between two display modes of a two-dimensional display mode and a three-dimensional display mode. Such changing capability may be achieved by using a variable lens array, of which the lens effect may be electrically controlled to be on or off, as the cylindrical lens array 302. Such a variable lens array may be achieved by a liquid crystal lens or a liquid lens. By using the variable lens array, in the two-dimensional display mode, the lens array is changed into a state with no lens effect (state with no refracting power), and directly transmits display image light from a two-dimensional display device. In the three-dimensional display mode, the lens array is changed into a state with a lens effect being produced (for example, a state with positive refracting power), and deflects display image light from a two-dimensional display device in a plurality of view angle directions, so that stereoscopic vision is achieved.

Figure 8:
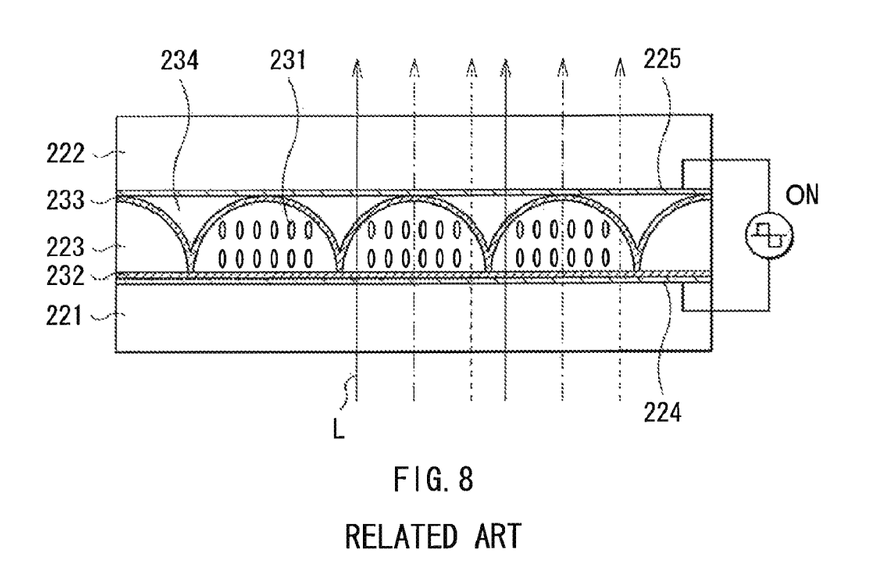
FIG. 8 is a section view showing a configuration example of a switching lens array using a liquid crystal lens in a state with no lens effect.
Figure 9:
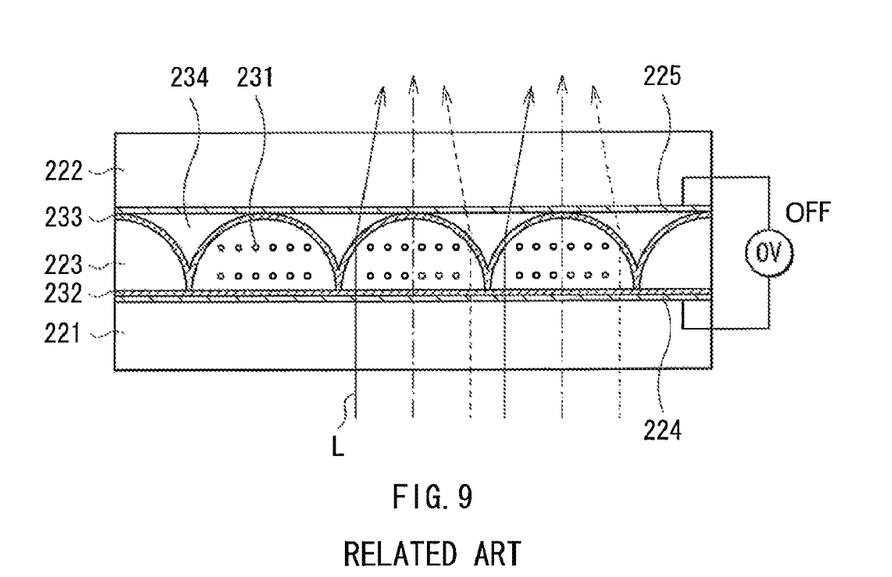
FIG. 9 is a section view showing a configuration example of the switching lens array using the liquid crystal lens in a state with a lens effect being produced.

FIGS. 8 and 9 show a configuration example of a variable lens array using a liquid crystal lens. The variable lens array includes transparent, first and second substrates 221 and 222 including a glass material or the like, and a liquid crystal layer 223 sandwiched between the first and second substrates 221 and 222. A first transparent electrode 224 including a transparent conductive film such as an ITO (Indium Tin Oxide) film is uniformly formed on approximately the whole surface on a liquid crystal layer 223 side of the first substrate 221. Similarly, a second transparent electrode 225 is uniformly formed on approximately the whole surface on a liquid crystal layer 223 side of the second substrate 222.

The liquid crystal layer 223 is configured in such a manner that liquid crystal molecules 231 are filled in a mold formed into a concave lens shape by, for example, a manufacturing method called photoreplication process. An alignment film 232 is planarly provided on a surface on a first substrate 221 side of the liquid crystal layer 223. An alignment film 233, which is formed into a convex shape by a mold of a replica 234, is provided on a second substrate 222 side of the liquid crystal layer 223. That is, in the liquid crystal layer 223, the liquid crystal molecules 231 are filled between the lower, planer alignment film 232 and the upper, convex alignment film 233, and other upper regions are formed to be the replica 234. Thus, in the liquid crystal layer 223, each portion filled with the liquid crystal molecules 231 is formed into a convex shape. The convex portion selectively acts as a microlens depending on an applied voltage.

Each liquid crystal molecule 231 has refractive index anisotropy, and, for example, has an index ellipsoid structure having different refractive indexes to a passing light beam between longitudinal and lateral directions. In addition, the liquid crystal molecule 231 is changed in molecular arrangement depending on a voltage applied by the first and second transparent electrodes 224 and 225. Here, a refractive index to a passing light beam is assumed to be $n0$, the refractive index being given by molecular arrangement in a state where the liquid crystal molecule 231 is applied with a certain voltage as a differential voltage. A refractive index to a passing light beam is assumed to be $ne$, the refractive index being given by molecular arrangement in a state where a differential voltage is zero. The refractive indexes are in a magnitude relationship of $ne>n0$. A refractive index of the replica 234 is adjusted to be the same as the lower refractive index $n0$ in the state where the liquid crystal molecule 231 is applied with the certain voltage as the differential voltage.

Thus, when the differential voltage applied by the first and second transparent electrodes 224 and 225 is zero, a difference in refractive index to a passing light beam L occurs between the refractive index $ne$ of the liquid crystal molecule 231 and the refractive index $n0$ of the replica 234. In addition, a convex portion acts as a convex lens as shown in FIG. 9. In contrast, when the differential voltage corresponds to the predetermined voltage, a refractive index $n0$ of the liquid crystal molecule 231 to the passing light beam L becomes equal to a refractive index $n0$ of the replica 234 to the beam L, and therefore the convex portion does not act as a convex lens. Thus, a light beam is directly transmitted by the liquid crystal layer 223 without deflection as shown in FIG. 8.

Dick K. G. de Boer, Martin G. H. Hiddink, Maarten Sluijter, Oscar H. Willemsen and Siebe T. de Zwart, "Switchable lenticular based 2D/3D displays", SPIE Vol. 6490, 64900R (2007) discloses a display device that may be changed between two display modes of a two-dimensional display mode and a three-dimensional display mode by using such a liquid crystal lens. "Liquid Lens Technology: Principle of Electrowetting Based Lenses and Applications to Imaging" B. Berge, Proc. of IEEE Int' 1 Conf. of MEMS 2005, pp. 227-237, describes an electrowetting liquid lens of which the lens effect is controlled to be on or off depending on an applied voltage.

SUMMARY

In the case of a previous variable lens array, a relationship between an electrical on/off state of a device and an on/off state of a lens effect is inherent to a liquid crystal lens to be used or to a method of changing a liquid crystal lens. Therefore, a preferable relationship between the electrical on/off state of a device desired for a product, such as power consumption, and the on/off state of a lens effect is sometimes reversed. For example, in the liquid crystal lens described in the SPIE Vol. 6490, 64900R(2007), or the liquid lens described in the Proc. of IEEE Int' 1 Conf. of MEMS 2005, when a lens is electrically off, a lens effect is on, and when the lens is electrically on, the lens effect is off. Therefore, when the liquid crystal lens or the liquid lens is used for changing a display mode between the two-dimensional display mode and the three-dimensional display mode, the lens is used in an electrically on-state in the two-dimensional display mode, and used in an electrically off-state in the three-dimensional display mode. In this case, the lens is electrically on in the two-dimensional display mode, and needs to be continuously applied with a voltage to keep the on-state, therefore when the lens is used for a product frequently used for two-dimensional display, power consumption is increased. Such a difficulty of power consumption is a particularly large obstacle to device mounting in mobile products limited in power consumption.

When the relationship between the electrical on/off state and the on/off state of a lens effect is reversed to the above, the same difficulty may occur. For example, consideration is made on a variable lens array operating in such a manner, which is opposite to the above, that when a lens is electrically on, a lens effect is on, and when the lens is electrically off, the lens effect is off. In this case, the variable lens array is used in an electrically off state in the two-dimensional display mode, and used in an electrically on state in the three-dimensional display mode, and therefore when the variable lens array is used for a product frequently used for three-dimensional display oppositely to the above example, the variable lens array is disadvantageous in power consumption.

A currently developed variable lens produces either positive or negative refracting power as a lens effect. However, the variable lens array may not be necessarily used for any optical system without any change of a lens characteristic of the single variable lens. For example, an electrowetting liquid lens typically produces a lens effect of negative refracting power. In contrast, a variable lens producing positive refracting power is necessary for a cylindrical lens array for three-dimensional display. Therefore, the liquid lens producing negative refracting power may not be used for an optical system for three-dimensional display without any change of a lens characteristic of the liquid lens. Moreover, a refracting-power variable range of a single variable lens may be likely to be different from a refracting-power variable range desired in an optical system to be used.

It is desirable to provide a lens array device, in which a lens effect characteristic different from a lens effect characteristic of a single variable lens array may be easily obtained, and provide an image display device using the lens array device.

A lens array device according to an embodiment includes a variable lens array including a plurality of variable lenses each having electrically-adjustable refracting power, and a fixed lens array including a plurality of fixed lenses each provided in correspondence to each of the plurality of variable lenses, each of the fixed lenses having a refracting power which, once a corresponding variable lens has come to have a first refracting power, allows the first refracting power to be cancelled out.

According to the lens array device of the embodiment, the plurality of fixed lenses are provided in correspondence to the plurality of variable lenses, and when a corresponding variable lens has a first refracting power, the first refracting power is cancelled. The variable lens array is combined with the fixed lens array, thereby a lens effect characteristic different from a lens effect characteristic of a single variable lens array is obtained.

In the lens array device according to the embodiment, each of the variable lenses is adjustable at least between a state with no refracting power and a state with the first refracting power by an electrical on/off control of lens effect. Moreover, each of the fixed lenses has a second refracting power which, once the corresponding variable lens has come to on-state in lens effect to have the first refracting power, allows the lens effect to be cancelled out. In this case, when lens effect in the variable lens array is on (a state with certain refracting power being produced), total lens effect in a combination of the variable lens array and the fixed variable lens is off (a state with no refracting power). In addition, when the lens effect in the variable lens array is off, the total lens effect is on. That is, an electrical on/off characteristic of the lens effect of the overall lens array device is reversed from an on/off characteristic of a single variable lens array.

An image display device according to an embodiment includes a display panel performing two-dimensional image display, and a lens array device disposed to face a display surface of the display panel, and selectively changing a passing state of traveling of a light beam from the display panel. The lens array device includes the above lens array device according to the embodiment of the invention.

According to the image display device of the embodiment, an electrical characteristic is obtained, the electrical characteristic being different from that in the case that the variable lens array is singly used for a lens array device. According to the image display device of the embodiment of the invention, for example, an on/off state of a lens effect is appropriately changed using the lens array device according to the embodiment of the invention, thereby two-dimensional display and three-dimensional display may be electrically changed from each other. According to the lens array device of the embodiment of the invention, for example, the electrical on/off characteristic of the lens effect of the overall lens array device may be reversed from the on/off characteristic of the single variable lens array. Thus, for example, a state of power consumption is reversed from that in a case where the variable lens array is singly used for electrically changing a display state between two-dimensional display and three-dimensional display.

According to the lens array device of the embodiment, since a fixed lens array having refracting power cancelling a lens effect of a variable lens is provided, a lens effect characteristic different from a lens effect characteristic of a single variable lens array may be easily obtained. For example, a variable lens array singly having a negative-refracting-power variable range may be converted into a variable lens system having a positive-refracting-power variable range as the overall device. Moreover, for example, an electrical on/off characteristic of a lens effect of the variable lens array may be reversed.

According to the image display device of the embodiment, since the lens array device according to the embodiment is used to selectively change a passing state of a light beam from a display panel, an electrical characteristic may be easily obtained, the electrical characteristic being different from that in a case where a variable lens array is singly used for the lens array device. Thus, power consumption may be suppressed compared with a case where the variable lens array is singly used for changing a display state. For example, in a previous display device, when a case is considered as an example, where the variable lens array is singly used for a configuration where the variable lens array is electrically on in a two-dimensional display mode, and electrically off in a three-dimensional display mode, power consumption is increased in the two-dimensional display mode. On the other hand, in the image display device according to the embodiment of the invention, while the same type of variable lens array is used, the variable lens array may be electrically off in the two-dimensional display mode, and electrically on in the three-dimensional display mode, and consequently power consumption may be suppressed in the two-dimensional display mode.

Additional features and advantages are described herein, and will be apparent from the following Detailed Description and the figures.

BRIEF DESCRIPTION OF THE FIGURES

FIG. 1A shows a configuration in a two-dimensional display state, and FIG. 1B shows a configuration in a three-dimensional display state.

FIGS. 2A and 2B are section views showing an operation principle of an electrowetting liquid lens, where FIG. 2A shows a state with a lens effect being produced, and FIG. 2B shows a state with no lens effect.

FIG. 3A shows a configuration in a three-dimensional display state, and FIG. 3B shows a configuration in a two-dimensional display state.

FIGS. 4A and 4B are section views showing an operation principle of a field-drive liquid crystal lens, where FIG. 4A shows a state with no lens effect, and FIG. 4B shows a state with a lens effect being produced.

DETAILED DESCRIPTION

The present application will be described in detail below with reference to drawings according to an embodiment.

General Configuration of Lens Array Device and Image Display Device

Figure 1A:
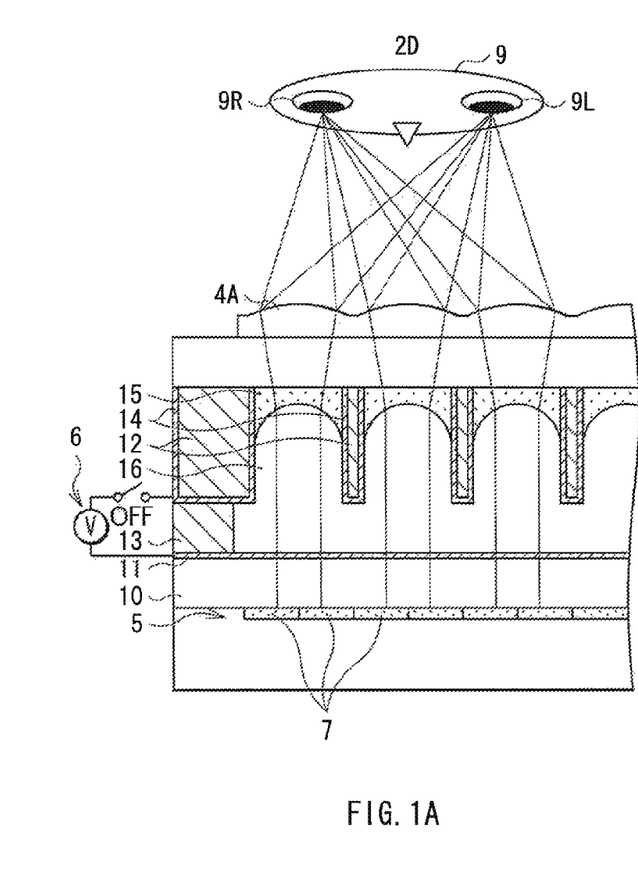
FIGS. 1A and 1B are section views showing a configuration of an image display device using a lens array device according to a first embodiment of the invention, where
Figure 1B:
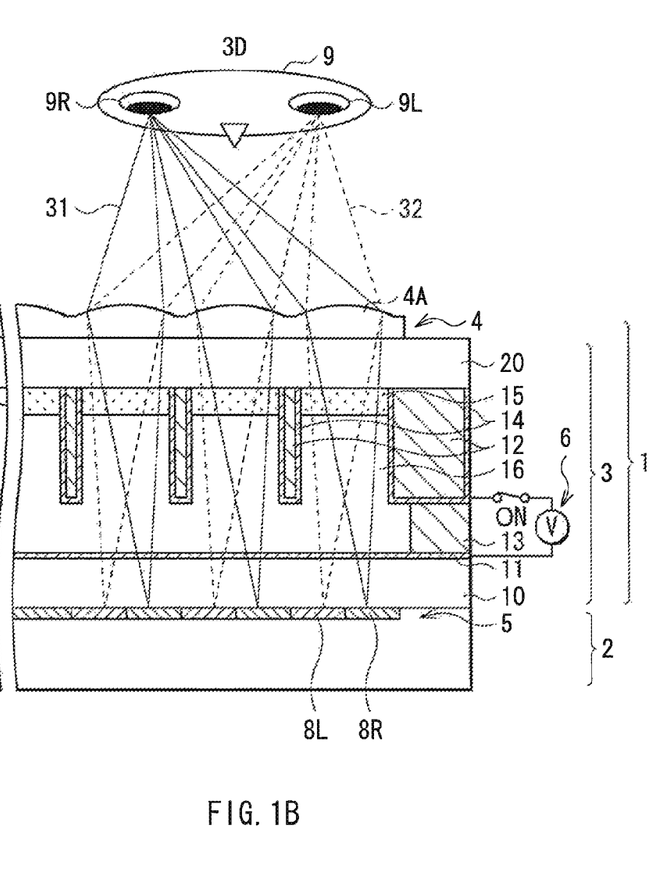

FIGS. 1A and 1B show a configuration example of an image display device using a lens array device 1 according to the embodiment. In the embodiment, an image display device is described, which may be changed between two display modes of a 2D (two-dimensional) display mode and a 3D (three-dimensional) display mode. FIG. 1A shows a display state in the two-dimensional display mode, and FIG. 1B shows a display state in the three-dimensional display mode. The image display device includes a lens array device 1 and a display panel 2 performing two-dimensional image display. The lens array device 1 is opposed to a display surface 5 side of the display panel 2.\

The display panel 2 may include, for example, a liquid crystal display. A plurality of display pixels 7 are regularly two-dimensionally arranged on a display surface 5 of the display panel 2. The display panel 2 performs picture display based on two-dimensional image data in the case of two-dimensional display, and performs picture display based on three-dimensional image data in the case of three-dimensional display. The three-dimensional image data, for example, refers to data including a plurality of parallax images corresponding to a plurality of view angle directions in three-dimensional display. In the embodiment, description is made on a case where twin-lens three-dimensional display is performed in the three-dimensional display mode. In the case of the twin-lens three-dimensional display, the three-dimensional image data are data of parallax images for right eye display and left eye display. The display panel 2 alternately displays each left parallax image 8L and each right parallax image 8R in a horizontal direction as shown in FIG. 1B.

The lens array device 1 electrically controls a lens effect to be on or off depending on a display mode so that a passing state of a light beam from the display panel 2 is selectively changed. The lens array device 1 has a variable lens array 3 and a fixed lens array 4 in order from the display surface 5 side of the display panel 2. The variable lens array 3 has a plurality of variable lenses, each lens having a lens effect that may be electrically controlled to be on or off.

The fixed lens array 4 has a plurality of fixed lenses provided in correspondence to a plurality of variable lenses, and each of the fixed lenses has refracting power cancelling a lens effect of a corresponding variable lens when the variable lens is on. More specifically, the fixed lens array 4 has a cylindrical lens array configuration where a plurality of cylindrical lenses 4A are arranged in parallel as fixed lenses. In the fixed lens array 4, each cylindrical lens 4A extends in a longitudinal direction with respect to the display surface 5 of the display panel 2, and is disposed so as to have positive refracting power in a horizontal direction. A lateral lens pitch of the cylindrical lenses 4A is, for example, corresponding to lateral size of two pixels on the display surface 5.

Configuration of Variable Lens Array

The variable lens array 3 has first and second substrates 10 and 20 opposed to each other with a space in between, and a liquid layer disposed between the first and second substrates 10 and 20. The liquid layer includes silicone oil 15 and an electrolyte 16. The first and second substrates 10 and 20 are transparent substrates including, for example, a glass material or a resin material. Partitions 12 and 13 are formed in a peripheral portion between the first and second substrates 10 and 20. Partitions 12 are formed at positions in correspondence to the lens pitch of the cylindrical lenses 4A between the first and second substrates 10 and 20. Each of the partitions 12 at positions in correspondence to the lens pitch is formed with a vertical length being short compared with an interval between the first and second substrates 10 and 20, and with a certain space from the first substrate 10. A liquid layer between adjacent, two partitions 12 forms a single variable lens. The single variable lens is corresponding to a single cylindrical lens 4A of the fixed lens array 4. A hydrophilic conductive film 11 is formed over approximately the whole surface of the first substrate 10 on a contact side to the liquid layer. A lipophilic conductive film 14 is formed over a surface of each partition 12.

Figure 2A:
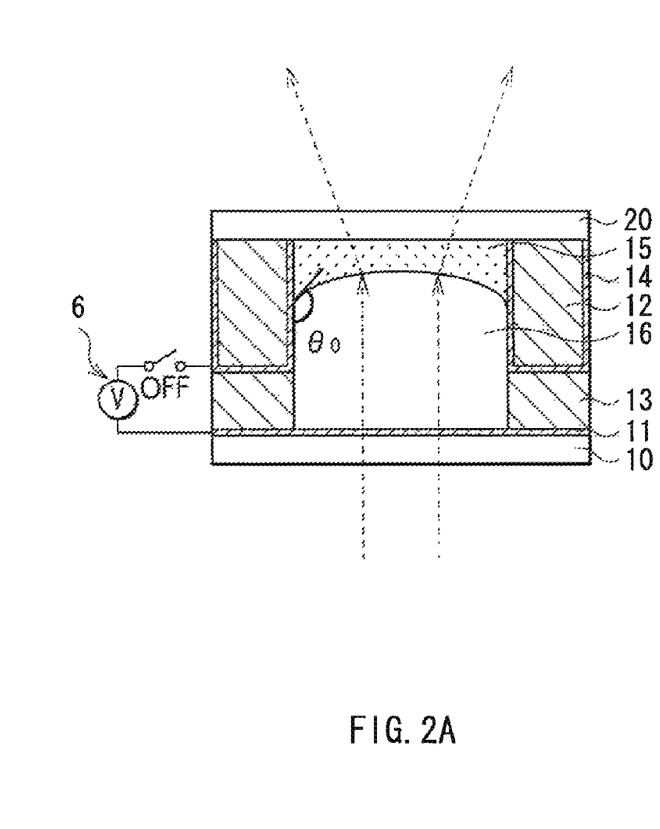
Figure 2B:
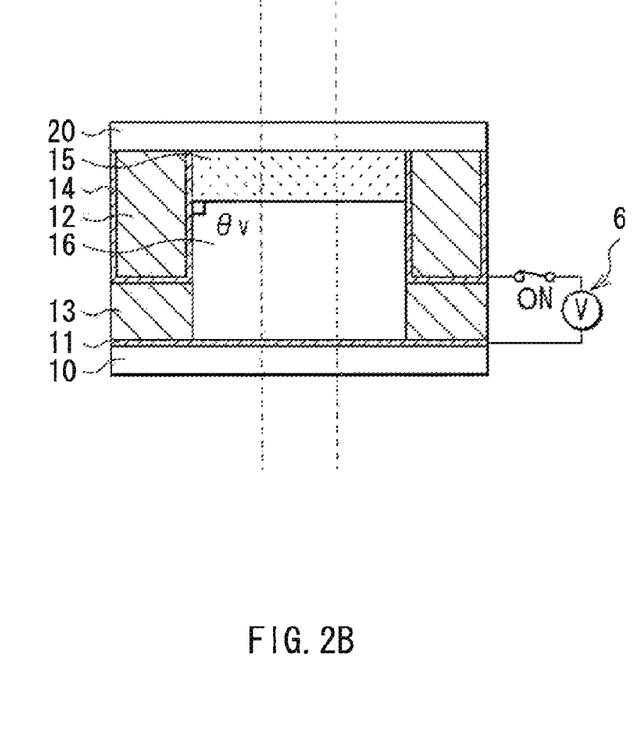

The variable lens array 3 is an electrowetting liquid lens array in which a lens effect is controlled to be on or off depending on applied voltage. A basic structure and an operation principle of the variable lens array 3 are described with reference to FIGS. 2A and 2B. Here, FIGS. 2A and 2B show a configuration of a single variable lens (liquid lens) to explain a basic principle. Portions corresponding to those of the structure shown in FIGS. 1A and 1B are marked with the same reference numerals or signs. FIG. 2A shows an on state of a lens effect (state with certain negative refracting power) being produced, and FIG. 2B shows an off state of the lens effect (state with no refracting power).

An electrowetting variable lens uses a phenomenon that wettability between a liquid and a solid surface is changed depending on an applied voltage, and thus controls a lens effect by changing an interfacial configuration between two kinds of liquid having different refracting indexes. In a structure of the variable lens shown in FIGS. 2A and 2B, the hydrophilic conductive film 11 is formed on the surface of the first substrate 10, and the lipophilic conductive film 14 is formed on the surface of each partition 12. In addition, silicone oil 15 is injected into a space between the first and second substrates 10 and 20 on a second substrate 20 side and a lipophilic conductive film 14 side, and an electrolyte 16 is injected into the space on a hydrophilic conductive film 11 side, and then the space is sealed. The hydrophilic conductive film 11 and the lipophilic conductive film 14 are electrically connected to a power supply 6 to be applied with a voltage respectively. FIG. 2B shows a state where a voltage is applied by the power supply 6 (electrically on state), and FIG. 2A shows a state where a voltage is not applied (electrically off state).

The electrolyte 16 has a property that wettability to the surface (lipophilic conductive film 14) of the partition 12 increases in proportion to square of applied voltage. Therefore, when a contact angle to the surface of the partition 12 is assumed to be $\theta_0$ in the case that applied voltage is zero, and assumed to be $\theta_V$ in the case that applied voltage is not zero, a relationship $\theta_0 > \theta_V$ is established. Furthermore, a certain applied voltage $V_{90}$ may be found, at which a lens effect is zero ($\theta_V = 90°$, at which an interfacial configuration between the silicone oil 15 and the electrolyte 16 becomes a plane). Thus, an applied voltage is changed between zero and the certain voltage $V_{90}$, thereby on/off changing control of the lens effect may be performed. When the silicone oil 15 is assumed to have a high refracting index compared with the electrolyte 16, a lens effect of negative refracting power is produced when a applied voltage is zero as shown in FIG. 2A.

That is, the variable lens operates such that when applied voltage is adjusted to zero so that the lens is electrically off, a lens effect is on (FIG. 2A). When applied voltage is adjusted to the certain voltage $V_{90}$ so that the lens is electrically on, a lens effect is off (FIG. 2B). Such a relationship between an electrical on/off state and an on/off state of the lens effect is inherent to the electrowetting liquid lens. Since a gravity effect on the silicone oil 15 may be adjusted to be equal to a gravity effect on the electrolyte 16 by a method that the two kinds of liquid are equalized in specific gravity, an interfacial configuration is assumed to be determined only by wettability depending on applied voltage, and assumed to be not affected by gravity herein.

Lens Operation of Overall Lens Array Device

Figure 10:
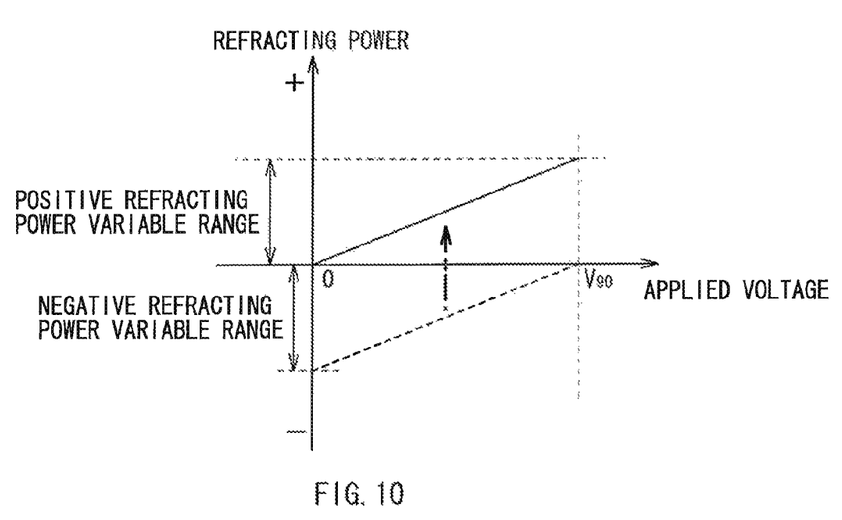
FIG. 10 is an explanatory diagram showing a lens effect of a combination of a variable lens array and a fixed lens array according to the first embodiment.

FIG. 10 conceptually shows a refracting-power-variable range of a single variable lens array 3, and a refracting-power-variable range of the overall lens array device 1 as a combination of the variable lens array 3 and the fixed lens array 4. Since the overall lens array device 1 produces refracting power in a horizontal direction, refracting power in the horizontal direction is described here. As described before, the variable lens array 3 is an electrowetting liquid lens, and singly produces a lens effect of negative refracting power as shown in FIG. 2A. Therefore, the single variable lens array 3 has such a negative refracting-power-variable range that the lens effect is zero at the certain voltage $V_{90}$ as shown by a broken line in FIG. 10. In contrast, the fixed lens array 4 singly has positive refracting power. Therefore, the refracting-power-variable range of the overall lens array device 1 as a combination of the variable lens array 3 and the fixed lens array 4 is changed into a state where refracting power is shifted to a positive refracting-power-variable range as shown by a solid line in FIG. 10. That is, in the lens array device 1, the variable lens array 3 singly having the negative refracting-power-variable range is converted into a variable lens system where the overall device has a positive refracting-power-variable range. Particularly, in the embodiment, the fixed lens array 4 has a refracting power cancelling a lens effect of the variable lens array 3 when the lens effect is on. Therefore, the overall lens array device 1 is of a variable lens system where when applied voltage is zero, refracting power is zero, and when the certain voltage $V_{90}$ is applied, certain positive refracting power is produced.

Control Operation of Lens Array Device and Image Display Device

Next, control operation of the lens array device 1 (control operation of the lens effect) and control operation of a display mode of an image display device using the lens array device 1 are described.

In the lens array device 1, when the power supply 6 does not apply voltage to the variable lens array 3 as shown in FIG. 1A (electrically off state), the lens effect of each of the plurality of variable lenses of the variable lens array 3 is on. The lens effect of each variable lens of the variable lens array 3 is cancelled by a corresponding fixed lens (cylindrical lens 4A) of the fixed lens array 4. That is, the total lens effect of a combination of the variable lens array 3 and the fixed lens array 4 is off. In this way, the overall lens array device 1 is adjusted into a state with no lens effect, so that display image light from the display panel 2 is transmitted without deflection, thereby the image display device performs two-dimensional display.

In contrast, when the power supply 6 applies voltage to the variable lens array 3 as shown in FIG. 1B (electrically on state), the lens effect of each of the variable lenses of the variable lens array 3 is off. In this state, a value of the voltage is adjusted such that the interfacial configuration between the silicone oil 15 and the electrolyte 16 configuring the liquid layer of the variable lens array 3 becomes a plane in individual variable lens portions. In such a state, the lens effect of the variable lens array 3 is singly disabled, and only a lens effect of the fixed lens array 4 is enabled. That is, the total lens effect of a combination of the variable lens array 3 and the fixed lens array 4 is on. In this way, the overall lens array device 1 is enabled in lens effect, so that the display panel 2 displays a left parallax image 8L and a right parallax image 8R. The displayed parallax images are separated into horizontally different light paths 31 and 32 by each cylindrical lens 4A of the fixed lens array 4. Thus, the left parallax image 8L and the right parallax image 8R are appropriately selectively injected into a left eye 9L and a right eye 9R of an observer 9 respectively, so that a stereoscopic image is perceived.

As described hereinbefore, according to the lens array device 1, since the fixed lens array 4 is provided, the fixed lens array having the refracting power canceling the lens effect of the variable lens array 3, an electrical on/off characteristic of the lens effect of the variable lens array 3 may be reversed. In the lens array device 1, when the lens effect of the variable lens array 3 is on (a state with certain negative refracting power being produced), the total lens effect of a combination of the variable lens array 3 and the fixed lens array 4 is off (a state with no refracting power). In addition, when the lens effect of the variable lens array 3 is off, the total lens effect is on. That is, an electrical on/off characteristic of the lens effect of the overall lens array device 1 is reversed from the on/off characteristic of the single variable lens array 3.

According to the image display device of the embodiment, the lens array device 1 is used to selectively change a passing state of a light beam from the display panel 2. Thus, power consumption may be suppressed compared with a case where the variable lens array 3 is singly used to change a display state. For example, in a previous image display device, when a case is considered as an example, where the variable lens array 3 is singly used for a configuration where a lens array device is electrically on in the two-dimensional display mode, and electrically off in the three-dimensional display mode, power consumption is increased in the two-dimensional display mode. On the other hand, in the embodiment, while the same type of variable lens array 3 is used, the electrical on/off characteristic of the lens effect may be reversed so that the lens array device is electrically off in the two-dimensional display mode, and electrically on in the three-dimensional display mode. Consequently, power consumption may be suppressed in the two-dimensional display mode. Particularly, when the image display device is used for a product more frequently used in the two-dimensional display, a large effect of suppressing power consumption is given. For example, when the image display device is used in such a way that a plane figure or text is normally displayed in the two-dimensional display mode, and the display mode is changed to a mode for displaying a three-dimensional image as necessary, the effect of suppressing power consumption may be obtained.

Modification of First Embodiment

While an example where the electrowetting liquid lens array is used as the variable lens array 3 has been shown in the above description, a variable lens having another structure may be used as long as the lens has the same mode of a relationship between an electrical on/off state of a device and an on/off state of a lens effect. That is, a variable lens having another structure may be used as the variable lens array 3 as long as the lens is of a type where when a device is electrically off, a lens effect is on, and when the device is electrically on, the lens effect is off.

For example, a variable lens array using a liquid crystal lens as shown in FIGS. 8 and 9 may be used. The variable lens array shown in FIGS. 8 and 9 is a liquid crystal lens array, of which the lens effect is controlled to be on or off depending on applied voltage, having a liquid crystal layer 223 structured such that liquid crystal molecules 231 having refracting index anisotropy are filled in a lens-shaped mold corresponding to a plurality of variable lenses. The liquid crystal lens array is configured such that when applied voltage is adjusted to zero, and thus the lens array is electrically off, a lens effect is on, and when applied voltage is adjusted to a certain voltage, and thus the lens array is electrically on, the lens effect is off. That is, a relationship between an electrical on/off state and an on/off state of the lens effect is the same as that of the electrowetting liquid lens array.

However, a structure shown in FIGS. 8 and 9 produces positive refracting power as the lens effect by filling the liquid crystal molecules 231 between a lower, planar alignment film 232 and an upper, convex alignment film 233 in the liquid crystal layer 223. In the case of using the structure for the variable lens array 3 in the embodiment, negative refracting power needs to be produced as the lens effect. To this end, for example, the alignment film 233 can be formed into a convex shape.

Second Embodiment

Next, an image display device using a lens array device according to a second embodiment is described. Substantially the same components as those of the image display device according to the first embodiment are marked with the same reference numerals or signs, and description of them is appropriately omitted.

Figure 3A:
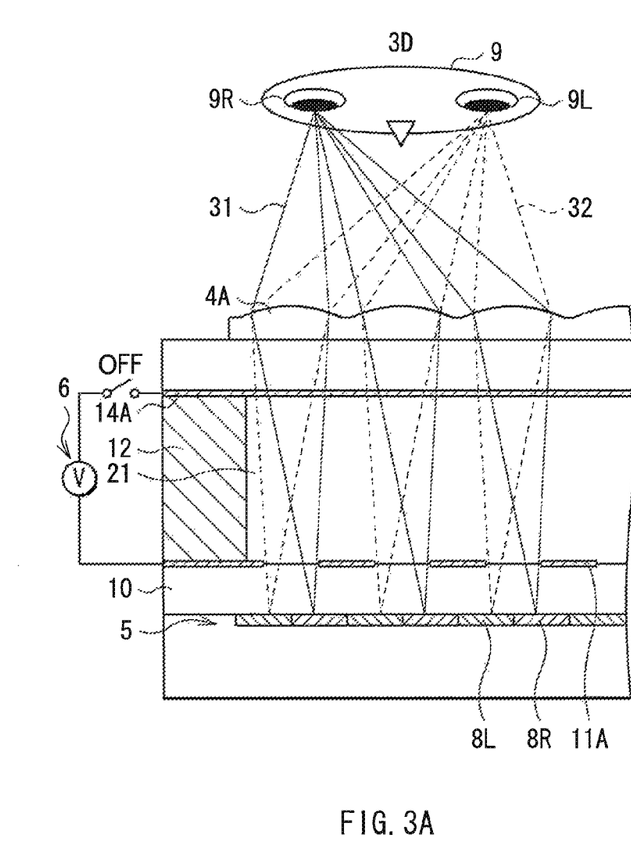
FIGS. 3A and 3B are section views showing a configuration of an image display device using a lens array device according to a second embodiment of the invention, where
Figure 3B:
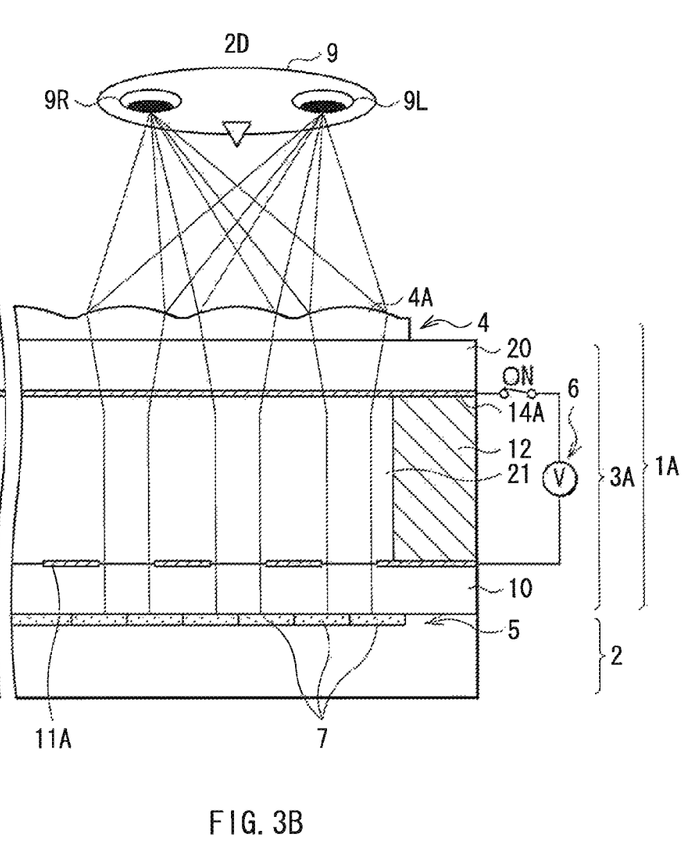

FIGS. 3A and 3B show a configuration example of an image display device using a lens array device 1A according to the embodiment. Even in the embodiment, an image display device is described, which may be changed between the two display modes of the two-dimensional display mode and the three-dimensional display mode. FIG. 3A shows a display state in the three-dimensional display mode, and FIG. 3B shows a display state in the two-dimensional display mode. The image display device includes a lens array device 1A and a display panel 2 performing two-dimensional image display. The lens array device 1A has a variable lens array 3A and a fixed lens array 4 in order from a display surface 5 of the display panel 2.

Configuration of Variable Lens Array

The image display device according to the embodiment is different in configuration of the variable lens array 3A from the image display device according to the first embodiment. The embodiment uses a relationship between an electrical on/off state of a single variable lens array 3A and an on/off state of a lens effect, the relationship being of a mode reversed from that in the first embodiment. That is, the embodiment uses the variable lens array 3A of a type where when the lens array is electrically off, a lens effect is off, and when the lens array is electrically on, the lens effect is on.

For example, a type of lens array may be used as the variable lens array 3A, where a liquid crystal layer 21 including liquid crystal molecules having refracting index anisotropy is provided, and arrangement of the liquid crystal molecules is changed by changing field strength distribution within the liquid crystal layer 21 depending on applied voltage, thereby a lens effect is controlled to be on or off. This type corresponds to a field-drive liquid crystal lens array.

Figure 4A:
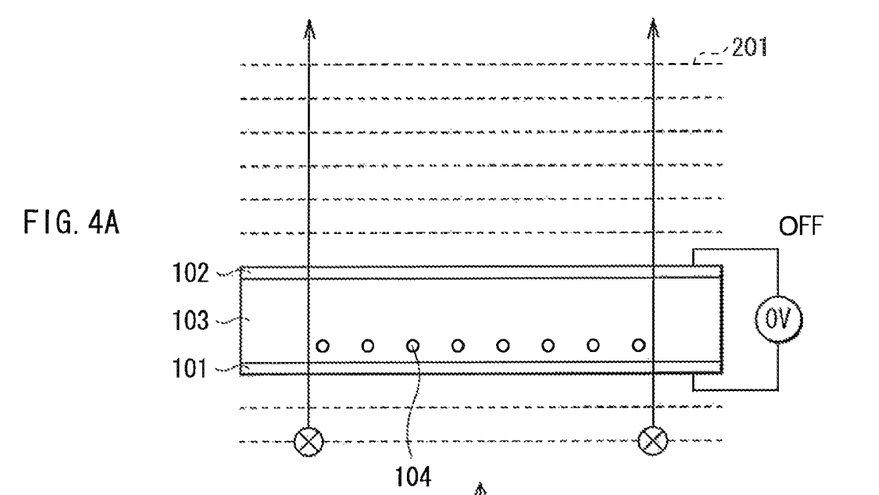
Figure 4B:
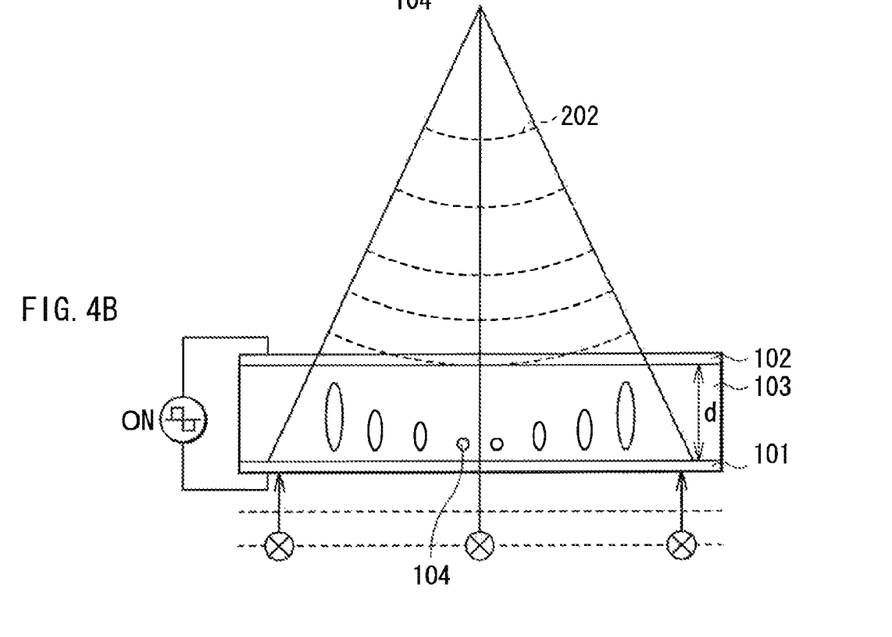
Figure 5:
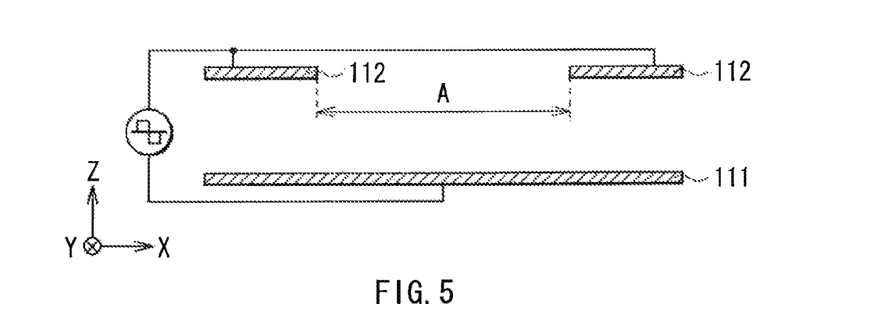
FIG. 5 is a section view showing a configuration example of an electrode portion of the liquid crystal lens shown in FIG. 4.

A basic structure and an operation principle of the field-drive liquid crystal lens array are described with reference to FIGS. 4A, 4B and FIG. 5. Here, FIGS. 4A, 4B and FIG. 5 show a configuration of a single variable lens (liquid crystal lens) to explain a basic principle. FIG. 4A shows a configuration where the variable lens is adjusted to be electrically off, so that a lens effect is off (a state with no refracting power). FIG. 4B shows a configuration where the variable lens is adjusted to be electrically on and thus the lens effect is on (a state with certain refracting power being produced).

As shown in FIGS. 4A and 4B, the liquid crystal lens array includes transparent, first and second substrates 101 and 102 including a glass material or the like, and a liquid crystal layer 103 sandwiched between the first and second substrates 101 and 102. The first and second substrates 101 and 102 are opposed to each other with an interval d in between.

A transparent electrode 111 including a transparent conductive film such as an ITO film, which is omitted to be shown in FIGS. 4A and 4B, is uniformly formed on approximately the whole surface of the first substrate 101 on a side facing the second substrate 102. Partial electrodes 112 including a transparent conductive film such as an ITO film are partially formed on the second substrate 102 on a side facing the first substrate 101 (refer to FIG. 5). The partial electrodes 112 are arranged in parallel at a periodical interval corresponding to a lens pitch when a lens effect is produced. A space between adjacent, two partial electrodes 112 is formed to be an opening having an interval A. The adjacent, two partial electrodes 112 are arranged at symmetric positions with respect to a light axis when a lens effect is produced.

An alignment film, which is omitted to be shown, is formed between the transparent electrode 111 and the liquid crystal layer 103. Similarly, an alignment film is formed between each partial electrode 112 and the liquid crystal layer 103. In the liquid crystal layer 103, liquid crystal molecules 104 having refracting index anisotropy are uniformly distributed in a normal condition as shown in FIG. 4A.

In the liquid crystal lens array, the liquid crystal molecules 104 are uniformly arranged in a certain direction defined by the alignment film in the normal condition where applied voltage is 0 V (electrically off state) as shown in FIG. 4A. Therefore, a wave front 201 of a passing light beam becomes a plane wave, leading to a state with no lens effect.

On the other hand, in the liquid crystal lens array, since the partial electrodes 112 are separated from one another with the opening having the interval A, when the lens array is applied with a certain drive voltage in a condition as shown in FIG. 5, deviation occurs in electric field distribution within the liquid crystal layer 103. That is, an electric field is generated such that electric field strength is increased in accordance with the drive voltage in a portion corresponding to a region where each partial electrode 112 is formed, and the electric field strength is decreased at a position closer to the center of the opening having the interval A. Therefore, arrangement of the liquid crystal molecules 104 is changed in accordance with electric field distribution as shown in FIG. 4B. Since each liquid crystal molecule 104 is different in refracting index between a major axis direction and a minor axis direction of the molecule, apparent refracting index of the molecule varies depending on a tilt angle of the molecule. In the liquid crystal lens array, phase difference (retardation) is made to occur, which occurs in a thickness direction of the liquid crystal layer 103 depending on tilt distribution of the liquid crystal molecules 104, so that a lens effect is produced and controlled. Thus, when the lens array is applied with the certain voltage to be electrically on, a wave front 202 of a passing light beam is changed as shown in FIG. 4B, leading to a state with the lens effect being produced.

Figure 6:
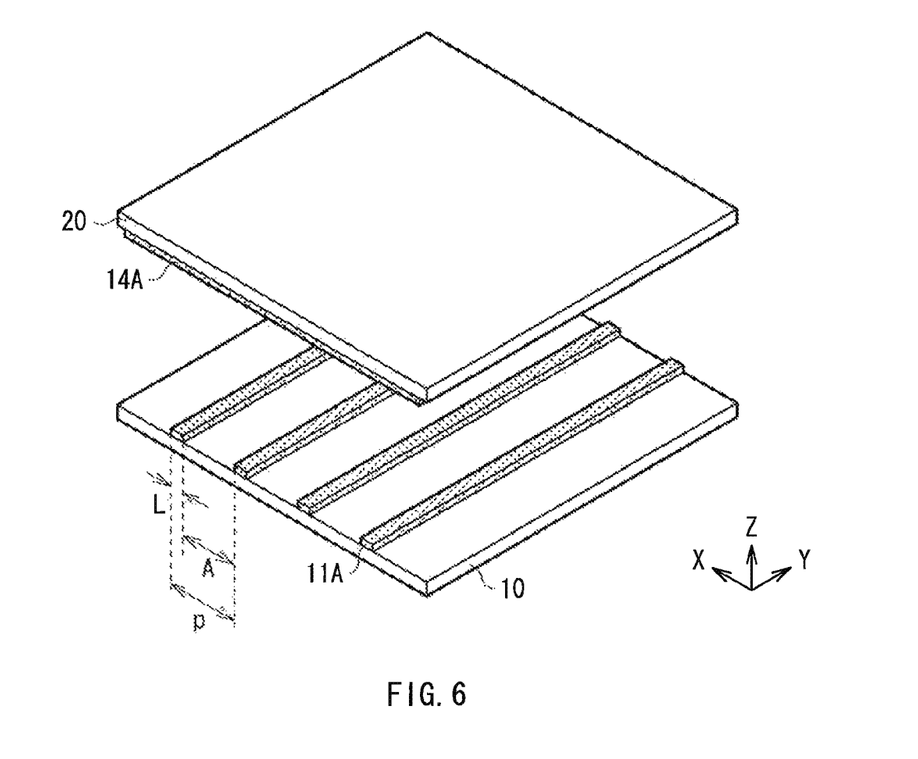
FIG. 6 is a perspective view showing a configuration example of an electrode portion of a variable lens array according to the second embodiment.

A structure of the variable lens array 3A according to the embodiment is described with reference to FIGS. 3A, 3B and FIG. 6. The variable lens array 3A is structured by using the field-drive liquid crystal lens array. However, the variable lens array 3A is structured such that a light axis direction thereof is vertically reversed from that shown in FIGS. 4A, 4B and FIG. 5. That is, an electrode structure is vertically reversed. More specifically, a transparent electrode 14A including a transparent conductive film such as ITO film is uniformly formed on approximately the whole surface of an upper, second substrate 20. Partial electrodes 11A including a transparent conductive film such as an ITO film are partially formed on a lower first substrate 10. Each partial electrode 11A extends in a longitudinal direction with an electrode width of L as shown in FIG. 6. The partial electrodes 11A are arranged in parallel at a periodical interval corresponding to a lens pitch p when a lens effect is produced. A space between adjacent, two partial electrodes 11A is formed to be an opening having an interval A. A region between the adjacent, two partial electrodes 11A forms a single variable lens. The single variable lens corresponds to a single cylindrical lens 4A of the fixed lens array 4. An extending direction of each partial electrode 11A is the same as an extending direction of each cylindrical lens 4A.

An alignment film, which is omitted to be shown, is formed between the transparent electrode 14A and the liquid crystal layer 21. Similarly, an alignment film is formed between each partial electrode 11A and the liquid crystal layer 21. In the liquid crystal layer 21, liquid crystal molecules 104 having refracting index anisotropy, which are omitted to be shown in FIG. 3A, are uniformly distributed in a normal condition as in the basic structure shown in FIG. 4A. Arrangement of the liquid crystal molecules 104, which is omitted to be shown in FIG. 3B, is changed depending on field strength distribution within the liquid crystal layer 21 in a condition that a certain voltage is applied, as in the basic structure shown in FIG. 4B.

Control Operation of Lens Array Device and Image Display Device

Next, control operation of the lens array device 1A (control operation of the lens effect) and control operation of a display mode of an image display device using the lens array device 1A are described.

In the lens array device 1A, when the power supply 6 does not apply voltage to the variable lens array 3A as shown in FIG. 3A (electrically off state), the lens effect of each of the plurality of variable lenses of the variable lens array 3A is off. In such a state, the lens effect of the variable lens array 3A is singly disabled, and only a lens effect of the fixed lens array 4 is enabled. That is, the total lens effect of a combination of the variable lens array 3A and the fixed lens array 4 is on. In this way, the overall lens array device 1A is enabled in lens effect, so that the display panel 2 displays a left parallax image 8L and a right parallax image 8R. The displayed parallax images are separated into horizontally different light paths 31 and 32 by each cylindrical lens 4A of the fixed lens array 4. Thus, the left parallax image 8L and the right parallax image 8R are appropriately selectively injected into a left eye 9L and a right eye 9R of an observer 9 respectively, so that a stereoscopic image is perceived.

In contrast, when the power supply 6 applies voltage to the variable lens array 3A as shown in FIG. 3B (electrically on state), the lens effect of each of the variable lenses of the variable lens array 3A is on. The lens effect of each variable lens of the variable lens array 3A is cancelled by a corresponding fixed lens (cylindrical lens 4A) of the fixed lens array 4. That is, the total lens effect of a combination of the variable lens array 3A and the fixed lens array 4 becomes off. In this way, the overall lens array device 1A is adjusted into a state with no lens effect, so that display image light from the display panel 2 is transmitted without deflection, thereby the image display device performs two-dimensional display.

As described hereinbefore, according to the lens array device 1A, since the fixed lens array 4 is provided, the fixed lens array having the refracting power canceling the lens effect of the variable lens array 3A, an electrical on/off characteristic of the lens effect of the variable lens array 3A may be reversed. In the lens array device 1A, when the lens effect of the variable lens array 3A is on (a state with certain refracting power being produced), the total lens effect of a combination of the variable lens array 3 and the fixed lens array 4 is off (a state with no refracting power). In addition, when the lens effect of the variable lens array 3A is off, the total lens effect is on. That is, an electrical on/off characteristic of the lens effect of the overall lens array device 1A is reversed from the on/off characteristic of the single variable lens array 3A.

However, in the embodiment, a mode of a relationship between an electrical on/off state of the single variable lens array 3A and an on/off state of the lens effect is reversed from that in the first embodiment. Therefore, a state of power consumption is reversed from that in the first embodiment. Therefore, when the image display device is used for a product more frequently used in three-dimensional display than in two-dimensional display, power consumption is particularly effectively suppressed. For example, in a previous lens array device, when a case where a lens array device includes a single field-drive liquid-crystal lens array is considered as an example, the device is electrically off in the two-dimensional display mode, and electrically on in the three-dimensional display mode, so that power consumption is increased in the three-dimensional display mode. On the other hand, in the embodiment, while variable lens array 3A of the same type as that of the field-drive liquid-crystal lens array is used, the electrical on/off characteristic of the lens effect may be reversed so that the lens array device is electrically off in the three-dimensional display mode, and electrically on in the two-dimensional display mode. Thus, power consumption may be suppressed in the three-dimensional display mode. Consequently, for example, when the image display device is used in such a way that a three-dimensional image is normally displayed, and the display mode is changed to a mode for displaying a plane figure or text in the two-dimensional display mode as necessary, the effect of suppressing power consumption may be obtained.

Other Embodiments

The present application is not limited to the above embodiments, and various modifications or alterations may occur.

For example, in the above embodiments, an effect of the cylindrical lens is produced as a lens effect of the lens array device 1 or 1A, so that two parallax images are displayed in a horizontal direction to perform three-dimensional display. However, a method of three-dimensional display is not limited to this. For example, multi-lens three-dimensional display, where at least three parallax images are displayed in a horizontal direction, may be used. In this case, at least three pixels 7 on the display panel 2 are included for each cylindrical lens. Furthermore, for example, a lens effect of a fly eye lens, where microlenses having a circular shape in a plane each are arranged in a matrix pattern, may be produced. In this case, display light may be deflected not only in a horizontal direction but also in another direction so as to perform three-dimensional display having a view angle in a direction other than the horizontal direction. In this case, for example, microlenses (spherical lenses) arranged in a matrix pattern, each microlens having a circular shape in a plane, are used for the fixed lens array 4. For the variable lens array 3 or 3A, a variable lens having a lens effect in correspondence to the circular microlens is used, the lens effect being able to be electrically controlled to be on or off While a case, where when a lens effect is produced in the lens array device 1 or 1A, three-dimensional display is performed, has been described in the above embodiments, the invention may be used in a case of another kind of display. For example, the invention may be used in the case of morphing display instead of the three-dimensional display. The morphing display mentioned herein refers to display where display content of an image is varied depending on a view position. For example, the morphing display refers to display where a shape or position of an object being two-dimensionally displayed is continuously changed when a visual point is moved in a horizontal direction.

In the above description, a case has been described, where refracting power of the plurality of variable lenses of the variable lens array 3 or 3A is simply electrically controlled into two states of a state with no refracting power and a state with certain refracting power. However, the invention of the application is not limited to such control. The invention may be used not only in the case that refracting power is simply controlled into two states, but also in the case that refracting power is controlled into more various states. For example, when a lens effect of a variable lens is on, refracting power may be controlled in multi stages into states with refracting power different from the certain refracting power. Even in this case, a lens effect characteristic different from a lens effect characteristic of a single variable lens array is obtained by combining the variable lens array with the fixed lens array.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A lens array device, comprising:
   a variable lens array including a plurality of variable lenses each having electrically-adjustable refracting power; and
   a fixed lens array including a plurality of fixed lenses each provided in correspondence to each of the plurality of variable lenses, each of the fixed lenses having a refracting power which, once a corresponding variable lens has come to have a first refracting power, allows the first refracting power to be cancelled out.

2. The lens array device according to claim 1, wherein
   each of the variable lenses is adjustable at least between a state with no refracting power and a state with the first refracting power by an electrical on/off control of lens effect,
   each of the fixed lenses has a second refracting power which, once the corresponding variable lens has come to on-state in lens effect to have the first refracting power, allows the lens effect to be cancelled out, and
   total lens effect in a combination of the variable lens array and the fixed variable lens is off when lens effect in the variable lens array is on, while the total lens effect is on when the lens effect in the variable lens array is off.

3. The lens array device according to claim 2, wherein
   the first refracting power in each of the variable lenses is a negative refracting power, and
   the second refracting power in each of the fixed lenses is a positive refracting power which allows the lens effect by the negative refracting power in each of the variable lens to be cancelled.

4. The lens array device according to claim 3, used for an image display device which is configured to electrically switch between two-dimensional display mode and three-dimensional display mode, wherein
   the total lens effect in the combination of the variable lens array and the fixed lens array is off in the two-dimensional display mode, and is on in the three-dimensional display mode.

5. The lens array device according to claim 2, wherein
   the lens effect of the variable lens array is on when the variable lens array is electrically off, and is off when the variable lens array is electrically on.

6. The lens array device according to claim 5, wherein
   the variable lens array is an electrowetting liquid lens array having a lens effect controlled to be on or off according to an applied voltage, and
   the lens effect in each of the variable lenses is on when the applied voltage is adjusted to zero to allow the variable lens array to be electrically off, and is off when the applied voltage is adjusted to a predetermined voltage to allow the variable lens array to be electrically on.

7. The lens array device according to claim 5, wherein
   the variable lens array is a liquid crystal lens array having a lens effect controlled to be on or off according to an applied voltage, each of the variable lenses in the variable lens array having a liquid crystal layer with a structure where a lens-shaped mold corresponding to each of the variable lenses is filled with liquid crystal molecules having refractive index anisotropy, and
   the lens effect in the variable lens array is on when the applied voltage is adjusted to zero to allow the variable lens array to be electrically off, and is off when the applied voltage is adjusted to a predetermined voltage to allow the variable lens array to be electrically on.

8. The lens array device according to claim 2, wherein
   the lens effect of the variable lens array is on when the variable lens array is electrically on, and is off when the variable lens array is electrically off.

9. The lens array device according to claim 8, wherein
   the variable lens array is a field-drive type of liquid-crystal lens array having a liquid crystal layer including liquid crystal molecules having refractive index anisotropy, the lens effect in the variable lens array being controlled to be on or off by changing field strength distribution within the liquid crystal layer according to an applied voltage to change alignment of the liquid crystal molecules, and
   the lens effect in the variable lens array is off when the applied voltage is adjusted to zero to allow the variable lens array to be electrically off, and is on when the applied voltage is adjusted to a predetermined voltage to allow the variable lens array to be electrically on.

10. An image display device, comprising:
    a display panel performing two-dimensional image display; and,
    a lens array device disposed to face a display surface of the display panel, and selectively changing a state of traveling of a light beam from the display panel,
    wherein the lens array device includes:
    a variable lens array including a plurality of variable lenses each having electrically-adjustable refracting power; and
    a fixed lens array including a plurality of fixed lenses each provided in correspondence to each of the plurality of variable lenses, each of the fixed lenses having a refracting power which, once a corresponding variable lens has come to have a first refracting power, allows the first refracting power to be cancelled out.

11. The image display device according to claim 10, wherein
    each of the variable lenses is adjustable at least between a state with no refracting power and a state with the first refracting power by an electrical on/off control of lens effect,
    each of the fixed lenses has a second refracting power which, once the corresponding variable lens has come to on-state in lens effect to have the first refracting power, allows the lens effect to be cancelled out, and
    total lens effect in a combination of the variable lens array and the fixed variable lens is off when lens effect in the variable lens array is on, while the total lens effect is on when the lens effect in the variable lens array is off.

12. The image display device according to claim 10, wherein
    total lens effect in a combination of the variable lens array and the fixed lens array is adjusted to be off, allowing display image light from the display panel to pass through the lens array device without deflection, thereby allowing the image display device to perform two-dimensional display, and
    the total lens effect in the combination of the variable lens array and the fixed lens array is adjusted to be on, allowing the display image light from the display panel to be deflected at least in a horizontal direction, thereby allowing the image display device to display different images at least in the horizontal direction.

13. The image display device according to claim 12, wherein a pair of parallax images are used as the different images, allowing the image display device to perform three-dimensional display when the total lens effect in the combination of the variable lens array and the fixed lens array is adjusted to be on.

* * * * *